United States Patent
Ben-Or et al.

(10) Patent No.: US 9,785,513 B2
(45) Date of Patent: *Oct. 10, 2017

(54) METHODS AND APPARATUS FOR PROVIDING HYPERVISOR LEVEL DATA SERVICES FOR SERVER VIRTUALIZATION

(71) Applicant: Zerto Ltd., Herzilya (IL)

(72) Inventors: Tomer Ben-Or, Givat Haim Ichud (IL); Gil Barash, Tel Aviv (IL); Chen Burshan, Tel Aviv (IL); Yair Kuszpet, Netanya (IL)

(73) Assignee: ZERTO LTD., Herzilya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,864

(22) Filed: Jun. 7, 2016

(65) Prior Publication Data

US 2016/0292044 A1 Oct. 6, 2016

Related U.S. Application Data

(63) Continuation of application No. 14/977,972, filed on Dec. 22, 2015, now Pat. No. 9,372,634, which is a
(Continued)

(51) Int. Cl.
*G06F 17/30* (2006.01)
*G06F 11/14* (2006.01)
(Continued)

(52) U.S. Cl.
CPC .......... *G06F 11/1451* (2013.01); *G06F 3/065* (2013.01); *G06F 3/0619* (2013.01); *G06F 3/0631* (2013.01); *G06F 3/0683* (2013.01); *G06F 11/1435* (2013.01); *G06F 11/1469* (2013.01); *G06F 11/1471* (2013.01); *G06F 11/1662* (2013.01); *G06F 11/2038* (2013.01); *G06F 11/2048* (2013.01);
(Continued)

(58) Field of Classification Search
None
See application file for complete search history.

(56) References Cited

U.S. PATENT DOCUMENTS 6,658,591 B1 12/2003 Arndt
6,910,160 B2 6/2005 Bajoria et al.
(Continued)

FOREIGN PATENT DOCUMENTS

WO WO-2009/151445 12/2009

OTHER PUBLICATIONS

Illuminata EMC RecoverPoint: Beyond Basics CDP Searched via internet on Nov. 10, 2013.
(Continued)

*Primary Examiner* — Debbie Le
(74) *Attorney, Agent, or Firm* — Foley & Lardner LLP; James De Vellis

(57) ABSTRACT

A data center for data backup and replication, including a pool of multiple storage units for storing a journal of I/O write commands issued at respective times, wherein the journal spans a history window of a pre-specified time length, and a journal manager for dynamically allocating more storage units for storing the journal as the journal size increases, and for dynamically releasing storage units as the journal size decreases.

20 Claims, 4 Drawing Sheets

Related U.S. Application Data continuation of application No. 14/478,518, filed on Sep. 5, 2014, now Pat. No. 9,251,009, which is a continuation of application No. 13/175,909, filed on Jul. 4, 2011, now Pat. No. 8,843,446.

(51) Int. Cl.
    *G06F 11/20*     (2006.01)
    *G06F 3/06*     (2006.01)
    *G06F 11/16*     (2006.01)

(52) U.S. Cl.
    CPC .... *G06F 11/2097* (2013.01); *G06F 2201/805* (2013.01); *G06F 2201/84* (2013.01)

(56) References Cited

U.S. PATENT DOCUMENTS

| | | | |
|---|---|---|---|
| 6,944,847 B2 | 9/2005 | Desai et al. | |
| 7,111,136 B2* | 9/2006 | Yamagami | G06F 11/1471 707/999.202 |
| 7,143,307 B1 | 11/2006 | Witte et al. | |
| 7,337,262 B2* | 2/2008 | Beeston | G06F 3/0613 711/100 |
| 7,337,762 B2 | 3/2008 | Eng et al. | |
| 7,398,363 B2 | 7/2008 | Innan et al. | |
| 7,475,207 B2 | 1/2009 | Bromling et al. | |
| 7,523,277 B1 | 4/2009 | Kekre et al. | |
| 7,577,817 B2 | 8/2009 | Karpoff et al. | |
| 7,577,867 B2 | 8/2009 | Lewin et al. | |
| 7,603,395 B1 | 10/2009 | Bingham et al. | |
| 7,685,378 B2* | 3/2010 | Arakawa | G06F 11/1471 711/154 |
| 7,844,577 B2 | 11/2010 | Becker et al. | |
| 7,849,361 B2 | 12/2010 | Ahal et al. | |
| 8,060,468 B2 | 11/2011 | Deguchi et al. | |
| 8,140,806 B2 | 3/2012 | Vingralek et al. | |
| 8,356,150 B2 | 1/2013 | Fachan et al. | |
| 8,843,446 B2 | 9/2014 | Ben-Or et al. | |
| 2004/0068561 A1 | 4/2004 | Yamamoto et al. | |
| 2004/0268067 A1 | 12/2004 | Yamagami | |
| 2005/0044170 A1 | 2/2005 | Cox et al. | |
| 2005/0171979 A1 | 8/2005 | Stager et al. | |
| 2005/0182953 A1 | 8/2005 | Stager et al. | |
| 2005/0188256 A1 | 8/2005 | Stager et al. | |
| 2006/0047996 A1 | 3/2006 | Anderson et al. | |
| 2006/0190692 A1 | 8/2006 | Yamagami | |
| 2007/0028244 A1 | 2/2007 | Landis et al. | |
| 2008/0046667 A1 | 2/2008 | Fachan et al. | |
| 2008/0195624 A1 | 8/2008 | Ponnappan et al. | |
| 2009/0249330 A1 | 10/2009 | Abercrombie et al. | |
| 2010/0017801 A1 | 1/2010 | Kundapur | |
| 2010/0198972 A1 | 8/2010 | Umbehocker | |
| 2011/0022812 A1 | 1/2011 | Van Der Linden et al. | |
| 2011/0099200 A1 | 4/2011 | Blount et al. | |
| 2011/0099342 A1 | 4/2011 | Ozdemir | |
| 2011/0125980 A1 | 5/2011 | Brunet et al. | |
| 2011/0131183 A1 | 6/2011 | Chandhok et al. | |

OTHER PUBLICATIONS

Mendocino: The RecoveryOne Solution, Architecture Guide, 22 pages Product Version 1.0, Jan. 3, 2006.
NetWorker PowerSnap Module for EMC Symmetrix, Release 2.1 Installation and Administrator's Guide, 238 pgs, printed Sep. 2005.
Olzak, T., "Secure hypervisor-based virtual server environments", Feb. 26, 2007. http://www.techrepublic.com/blog/security/secure-hypervisor-based-virtual-server-environments/160.
US Notice of Allowance for U.S. Appl. No. 14/977,972 dated May 16, 2016.
US Notice of Allowance on U.S. Appl. No. 13/175,909 DTD Aug. 7, 2014.
US Notice of Allowance on U.S. Appl. No. 14/478,518 dated Oct. 13, 2015.
US Office Action on U.S. Appl. No. 13/175,909 DTD Mar. 25, 2014.
US Office Action on U.S. Appl. No. 13/175,909 DTD May 20, 2013.

\* cited by examiner

METHODS AND APPARATUS FOR PROVIDING HYPERVISOR LEVEL DATA SERVICES FOR SERVER VIRTUALIZATION

RELATED APPLICATIONS

This application is a continuation of, and claims the benefit and priority under 35 U.S.C. §120, to U.S. patent application Ser. No. 14/977,972, titled "Methods and Apparatus for Providing Hypervisor Level Data Services for Server Virtualization," filed Dec. 22, 2015, U.S. patent application Ser. No. 14/478,518, titled "Methods and Apparatus for Providing Hypervisor Level Data Services for Server Virtualization," filed Sep. 5, 2014 and issued on Feb. 2, 2016 as U.S. Pat. No. 9,251,009, and to U.S. patent application Ser. No. 13/175,909, filed on Jul. 4, 2011 and issued on Sep. 23, 2014 as U.S. Pat. No. 8,843,446, titled "Methods and Apparatus for Time-Based Dynamically Adjusted Journaling", each of which is incorporated herein by reference in its entirety.

FIELD OF THE INVENTION

The present invention relates to data backup and replication.

BACKGROUND OF THE INVENTION

Data backup and replication systems create copies of enterprise data at local or remote sites. Some conventional backup and replication systems operate by tracking I/O write commands from physical or virtual servers to storage devices such as storage area network (SAN), network attached storage (NAS) and direct attached storage (DAS). Other conventional systems operate by creating clones or snapshots of enterprise data. Such systems generally save only the last snapshot or clone on disk, or several last snapshots or clones. Recent systems provide continuous data protection (CDP) by journaling write commands so at so provide any point in time data recovery.

Conventional systems limit CDP capability based on disk space available to maintain a journal. Service providers define their objectives and service level agreements (SLAs) in terms of time. For CDP, the SLA generally relates to the window of time history that can be recovered.

As such, a drawback with conventional data backup and replication systems is that an IT professional must be able to correctly estimate the disk space that will be required in order to maintain a desired time frame, and reserve this amount of disk space. Generally, the estimation is inaccurate and the reserved disk space is wasted. Specifically, during off-peak periods, the reserved disk space is unused, and during peak periods the disk space is not able to accommodate all of the changes and maintain the entire SLA history window.

Today, enterprise infrastructures are evolving as pools of resources for on-demand use, instead of reserved pre-allocated resources. Thus it would be of advantage to provide a data backup and replication system that is flexibly adaptable to journal size requirements.

SUMMARY OF THE DESCRIPTION

Aspects of the present invention overcome drawbacks with conventional data backup and replication systems, by leveraging a resource pool of enterprise storage units available for journaling and data replication, to adjust the size of a CDP journal on demand. Data backup and replication systems of the present invention flexibly accommodate disk space required for journaling, allocating more storage units during peak periods, and releasing storage units during off-peak periods.

Further aspects of the present invention enable test journaling in parallel with production journaling, by allocating storage units devoted to test data. The storage units devoted to test data are allocated as required during a test, and are released upon completion of the test. Production data replication and protection continue in parallel with test journaling, without disruption.

There is thus provided in accordance with an embodiment of the present invention a data center for data backup and replication, including a pool of multiple storage units for storing a journal of I/O write commands issued at respective times, wherein the journal spans a history window of a pre-specified time length, and a journal manager for dynamically allocating more storage units for storing the journal as the journal size increases, and for dynamically releasing storage units as the journal size decreases.

There is additionally provided in accordance with an embodiment of the present invention a computer-based method for a data center, including receiving, by a computer at a sequence of times, new data to add to a journal, the journal including one or more allocated storage resources from a pool of resources, and wherein journal data is stored in the allocated storage resources and promoted from time to time to a recovery disk, determining, by the computer, if the journal already contains data for an entire pre-designated time history, additionally determining, by the computer, if the addition of the new data to the journal would cause the journal to exceed a pre-designated maximum size, further determining, by the computer, if the additional of the new data to the journal requires allocating an additional storage resource to the journal, when the further determining is affirmative, then yet further determining, by the computer, if the pool of resources has a free storage resource available, when the determining or the additionally determining or the yet further determining is affirmative, then promoting, by the computer, old time data to a recovery disk, removing, by the computer, old time data from the journal, and releasing, by the computer, one or more of the storage resources from the journal, if all of the data from the one or more storage resources was promoted to the recovery disk, when the further determining is affirmative, then allocating, by the computer, an additional storage resource to the journal, and adding, by the computer, the new data to the journal.

There is further provided in accordance with an embodiment of the present invention a method for data backup and replication, including accessing a pool of multiple storage units for storing a journal of I/O write commands issued at respective times, wherein the journal spans a history window of a pre-specified time length, dynamically allocating more storage units for storing the journal as the journal size increases, and dynamically releasing storage units as the journal size decreases.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to data backup and replication systems that flexibly allocate and release storage units required for journaling, from a resource pool of storage units, allocating more storage units during peak periods, and releasing storage units during off-peak periods.

Figure 1:
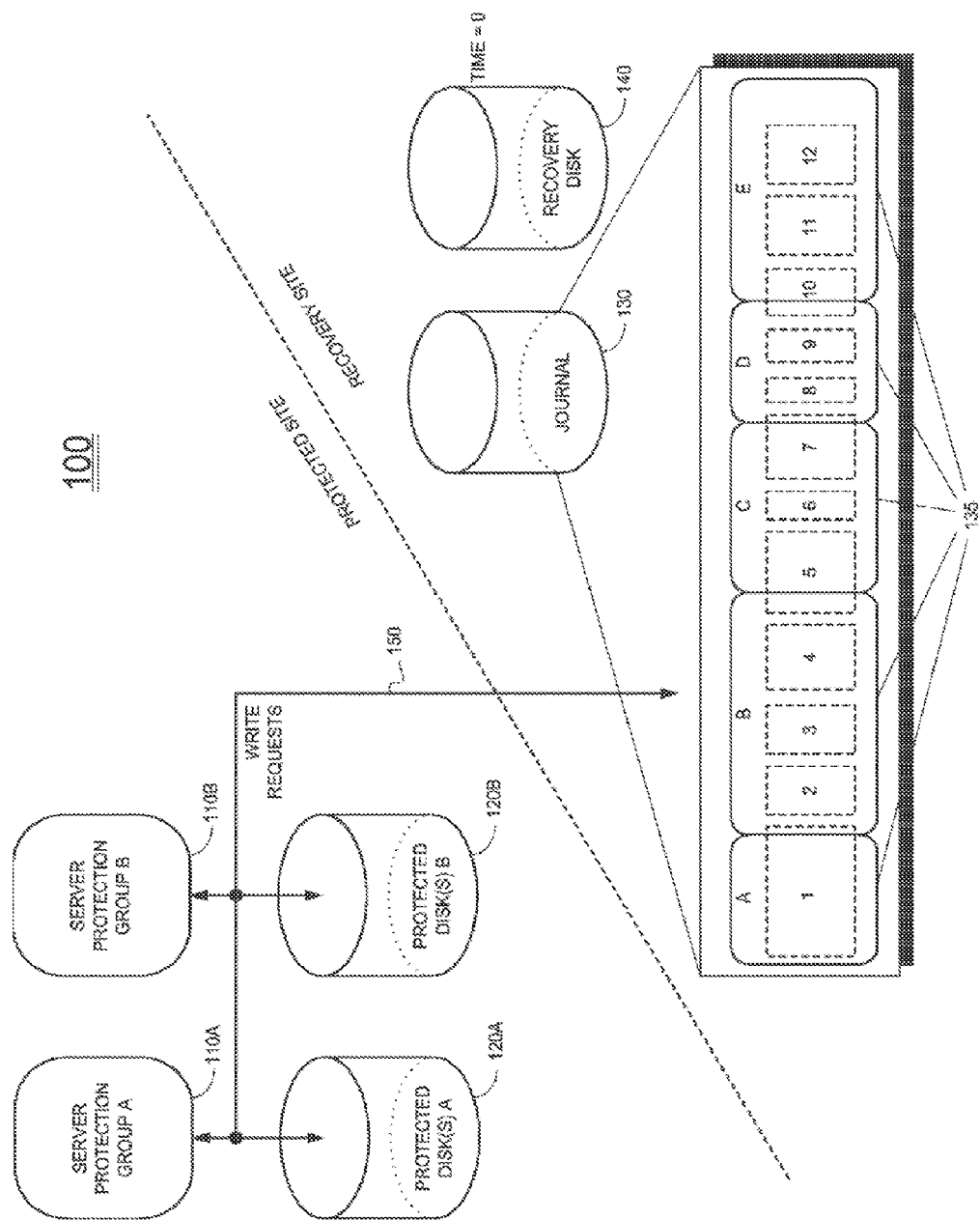
FIG. 1 is a first simplified diagram of a data center with enhanced data replication journaling, in accordance with an embodiment of the present invention.

Reference is made to FIG. 1, which is a first simplified diagram of a data center 100 with enhanced data replication journaling, in accordance with an embodiment of the present invention. Data center 100 is used to replicate data from a protected site to a recovery site. The replicated data may be used for a failover, to ensure business continuity when the protected site is not fully functional.

As shown in FIG. 1, protection is configured individually for different server groups, such as server group 110A and server group 110B. Each server group 110A and 110B includes one or more physical or virtual servers. Each server group 110A and 110B reads and writes data in one or more respective physical or virtual disks 120A and 120B.

The recovery site includes a journal 130 and one or more recovery disks 140. Data transfer between the protected site and the recovery site is via a wide area network (WAN) 150.

Data center 100 replicates data by intercepting write requests between server groups 110A and 110B and their respective disks 120A and 120B, transmitting the write requests to journal 130 via WAN 150, storing the write requests as journal entries in journal 130, and periodically promoting the write requests to recovery disk 140 by applying them to the data in recovery disk 140 and thereby updating recovery disk 140 to a more recent time.

In accordance with an embodiment of the present invention, journal 130 uses a pool of storage resources as necessary, instead of using dedicated storage. The journal shown in FIG. 1 stores a history window of 12 hours' worth of data, each hour's worth of data being numbered chronologically "1"-"12" from oldest to newest. I.e., the first hour's data is labeled "1", and the 12th hour's data is labeled "12". The various individual hours' worth of data are of varying sizes, as different amounts of data activity occur during different hours of the day. At the stage shown in FIG. 1, the data in recovery disk 140 corresponds to the zero-hour data (TIME=0).

Moreover, journal 130 stores its history in data chunks 135, each data chunk being stored in a different resource from the pool of storage resources. Data chunks 135 are labeled "A"-"E" for reference. Data chunks 135 are also of varying sizes, as the resources from the pool of resources are generally of different sizes. In general, an hour's worth of data may fit within a single data chunk 135, or may require more than one data chunk 135.

Journal 130 is configured by an administrator to store a specified time history window of data, irrespective of space required. Journal 130 allocates and de-allocates resources from the pool of storage resources, to dynamically expand when more data chunks 135 are required and to dynamically contract when fewer data chunks 135 are required. As such, resources are freed for other applications when journal 130 requires less storage space, instead of being dedicated to the journal as in conventional journaling systems.

Figure 2:
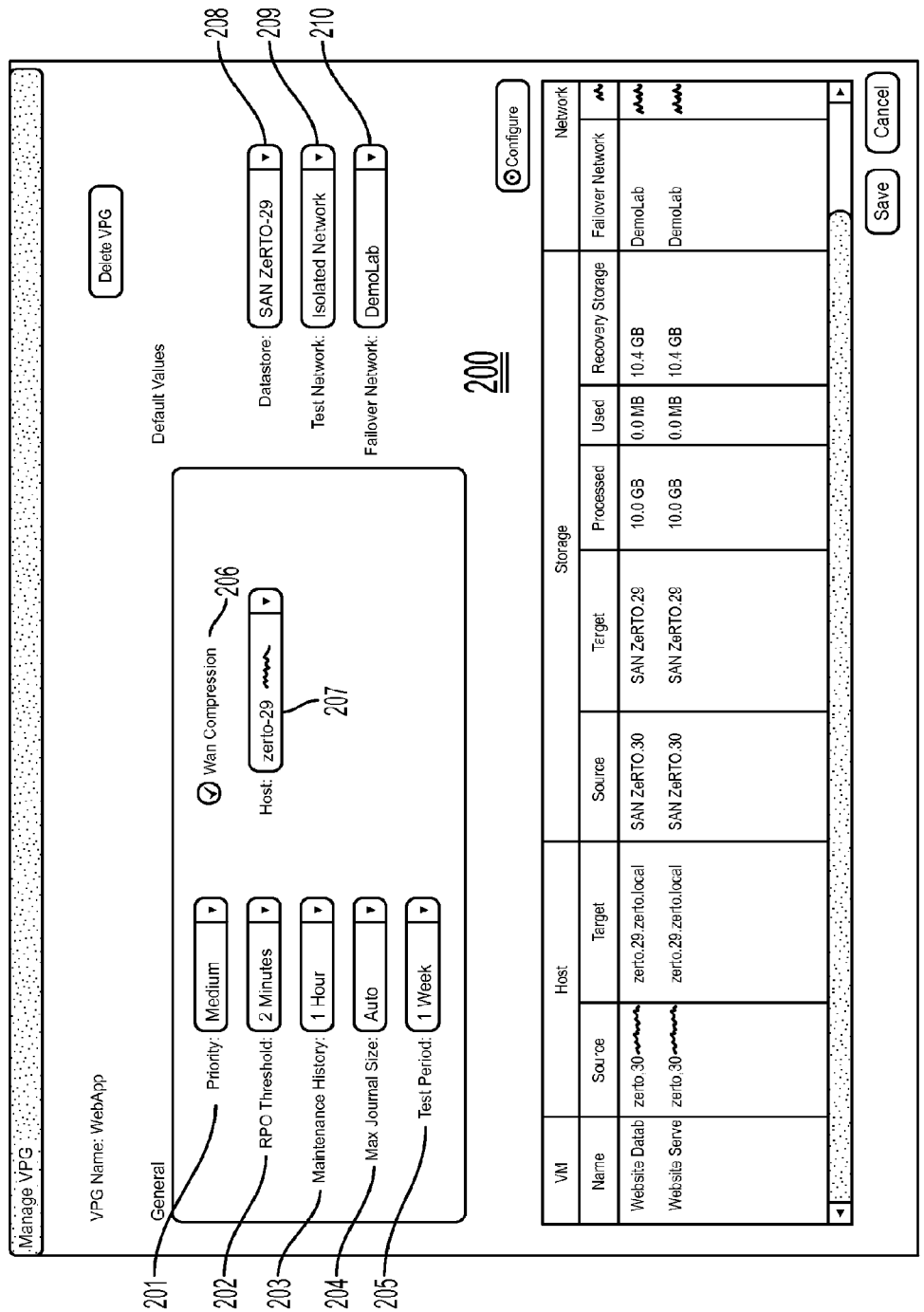
FIG. 2 is an administrative user interface screenshot for setting data replication journal parameters, in accordance with an embodiment of the present invention.

Reference is made to FIG. 2, which is a screenshot of an administrative user interface 200 for setting data replication journal parameters for a protection group, such as server group 110A, in accordance with an embodiment of the present invention. Shown in FIG. 2 are settings 201-210 for specifying various protection group parameters. Setting 201 is for specifying a priority, used for determining priority for transferring data from the protection group to the recovery site, when WAN 150 has limited bandwidth and when there is more than one protection group at the protected site. Setting 202 is for specifying a recovery point objective (RPO) threshold, which is the maximum desired time lag between the latest data written at the protected site and the latest data safely replicated at the recovery site. Setting 203 is for specifying a maintenance history, which is the time window for which write commands are saved in journal 130. E.g., if the specified maintenance history is 12 hours, as in FIG. 1, then data may be recovered to any checkpoint within the past 12 hours. Setting 204 is for specifying a maximum journal size. When journal 130 reaches its maximum size, older journal entries are promoted to recovery disk 140 and removed from journal 130. Setting 205 is for specifying a test period, which is a time between tests for checking integrity of the protection group. Setting 206 is for specifying WAN compression; i.e., whether or not data is compressed at the protected site prior to being transferred via WAN 150 to the recovery site. Setting 207 is for specifying a host at the recovery site that handles the replicated data. Setting 208 is for specifying a datastore at the recovery site for storing the replicated data. Setting 209 is for specifying a test network for use during a test failover. Setting 210 is for specifying a failover network for use during an actual failover. Generally, the failover network is a network suitable for the recovery site deployment architecture.

Figure 3:
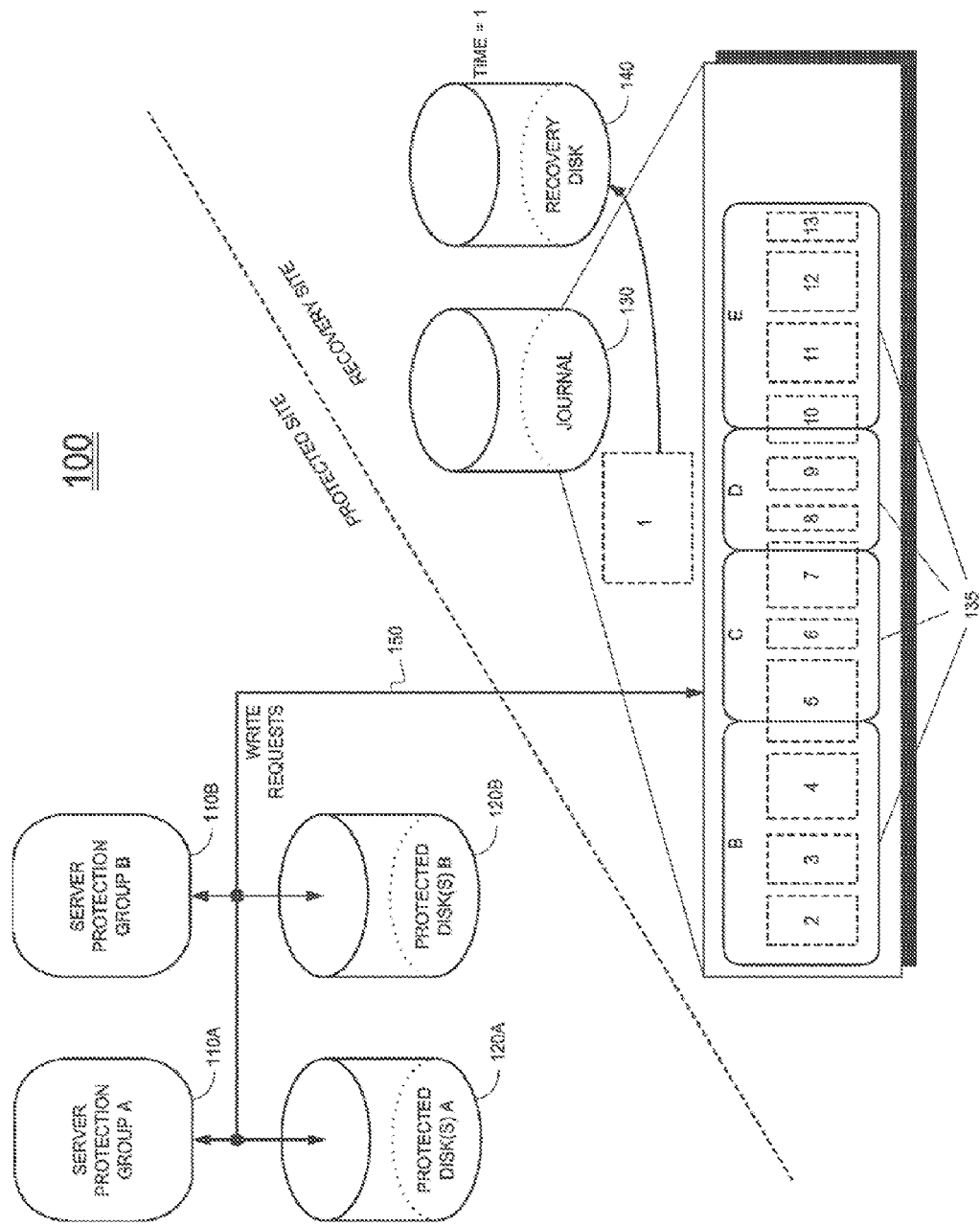
FIG. 3 is a subsequent simplified diagram of the data center, vis-à-vis the diagram shown in FIG. 1, in accordance with an embodiment of the present invention.

Reference is made to FIG. 3, which is a subsequent simplified diagram of data center 100, vis-à-vis the diagram shown in FIG. 1, in accordance with an embodiment of the present invention. FIG. 3 shows that when the journal stores a full window history of data, such as 12 hours' worth of data, and newer data arrives, the oldest hour's worth of data is promoted to recovery disk 140 prior to adding the newest data. Specifically, the data labeled "1", which is the oldest time data in journal 130, is promoted to recovery disk 140. I.e., the write requests in data "1" are applied to recovery disk 140, thereby updating the contents of disk 140 from being current for TIME=0 to being current for TIME=1. Data "1" is then removed from journal 130. Moreover, removal of data "1" frees data chunk A, which is then de-allocated so that it can be used by other applications, or reused by journal 130. Thereafter, the new data labeled "13" is added to journal 130, which now stores data "2" to "13".

FIG. 3 shows that that data "13" is smaller than data "1" and, as such, the space required for storing data "2" to "13" is less than the space required for storing data "1" to "12". Moreover, journal 130 does not require as many data chunks at TIME =13 than it did at TIME=12, and non-used resources are freed at TIME=13 for use by other applications. Specifically, data chunks "B"-"E" suffice for storing data "2" to "13", and data chunk "A" is freed up.

As shown in FIG. 2, setting 204 enables an administrator to specify a maximum journal size. When storage of new data would cause journal 130 to exceed its maximum size, the oldest data is promoted to recovery disk 140 and removed from journal 130, until journal 130 is able to store the new data within its size limit. In such case, journal 130 may store less than 12 hours' worth of data; i.e., less than the history specified by setting 203.

Figure 4:
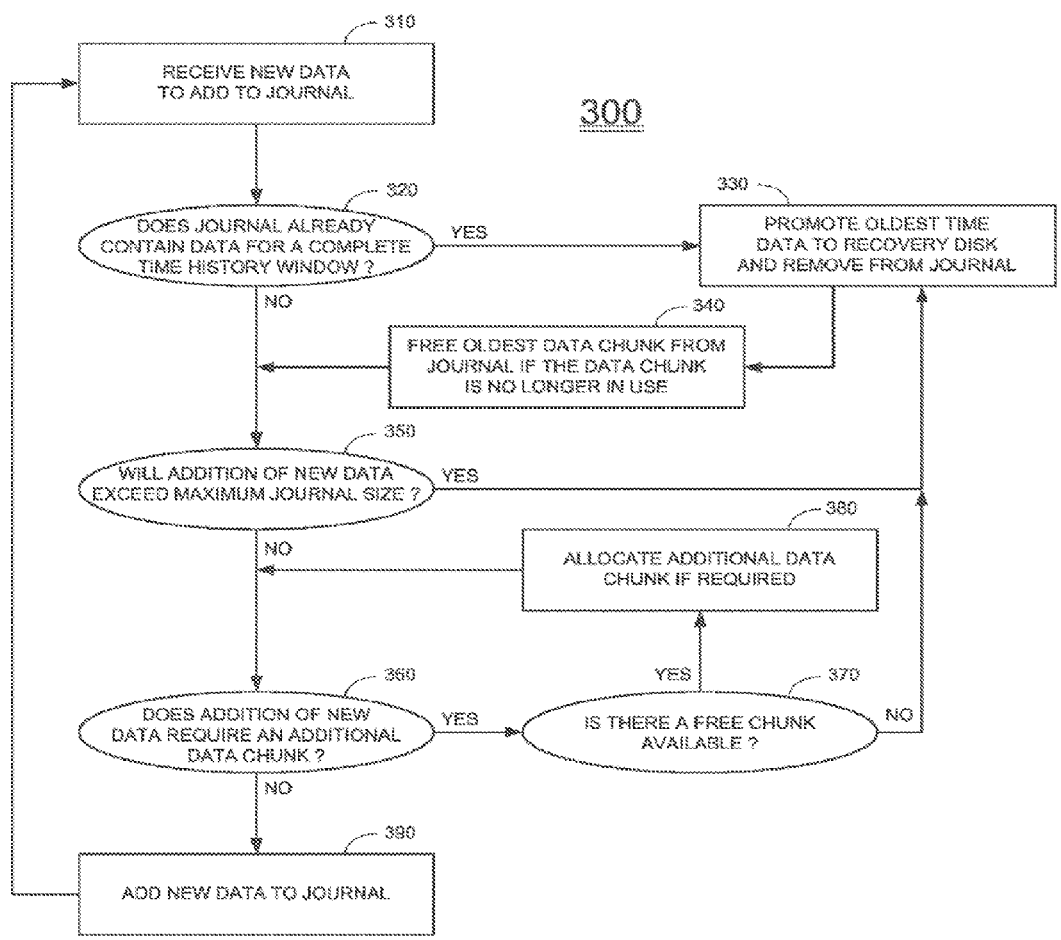
FIG. 4 is a simplified flowchart of a method for a data center, in accordance with an embodiment of the present invention.

Reference is made to FIG. 4, which is a simplified flowchart of a method 300 for a data center, in accordance with an embodiment of the present invention. At operation 310, new data is available for journaling. At operation 320 a determination is made whether or not journal 130 already contains a complete time window history of data, such as 12 hours' worth of data. If so, then at operation 330 the currently oldest time data in journal 130 is promoted to recovery disk 140 and removed from the journal. At operation 340 the oldest data chunk 135 is freed from the journal if all of the data that it stored was promoted to recovery disk 140, and processing advances to operation 350. If is determined at operation 320 that journal 130 does not contain a complete time window history of data, then processing advances directly from operation 320 to operation 350.

At operation 350 a determination is made whether or not addition of the new data would cause journal 130 to exceed its maximum size. If so, then processing returns to operation 330. Otherwise, processing advance to operation 360 where a determination is made whether or not addition of the new data requires allocation of an additional data chunk 135. If allocation of an additional data chunk is required, then at operation 370 a determination is made whether or not an additional data chunk is available from the resource pool. If an additional data chunk is not available, the processing returns to operation 330. If an additional data chunk is available, then at operation 380 an additional data chunk is allocated to the journal and processing returns to step 370. If it is determined at operation 360 that allocation of an additional data chunk is not required, then processing advances to operation 390 where the new data is added to the data chunks allocated to the journal.

Whenever operation 340 is performed, any unused resources by journal 130 are de-allocated and freed for use by other applications. Whenever operation 380 is performed, additional resources are allocated to journal 130.

In accordance with an alternate embodiment of the present invention, allocation and de-allocation of resources for journal 130 is performed asynchronously with the actual journaling. Specifically, promotion of data from journal 130 to recovery disk 140, allocation of resources 135, and de-allocation of resources 135 are performed periodically, irrespective of whether or not new data has arrived for journaling. As a result, the speed of journaling new data is increased, since operations 320-380 of FIG. 4 are not performed at the time of journaling the new data. In this alternate embodiment, the maximum size constraint is not enforced at all times, and instead is exceeded for short durations.

The above description relates to production journaling. However, the present invention also applies to test journaling, for testing integrity of data recovery during a failover. In this regard, it is noted that prior art systems generally stop replication of production data while a test is being performed. As such, new production data is not being protected during the test.

Using the present invention, journal testing is performed in parallel with production journaling, in order to avoid disruption of production replication and protection.

For test journaling, data chunks 135 devoted to testing are allocated to the journal, as required for storing test data, in addition to the production data chunks 135 described hereinabove. During a test, journal test data is stored in data chunks devoted to testing and, in parallel, journal production data is stored in production data chunks. The data chunks devoted to testing are not promoted to recovery disk 140.

Upon completion of a journal test, the data chunks devoted to testing are released, and the production data continues to be journaled.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for data backup and replication, comprising:
   transmitting, by a protected site computing device, a write request to a protected site disk, the write request intercepted by a recovery site computing device, interception of the write request causing the recovery site computing device to:
   select a variable size storage unit from a plurality of variable size storage units to store new data of the write request, each of the variable size storage units comprising one or more variable size data chunks and each of the one or more variable size data chunks corresponding to a window of time;
   set a size of the variable size storage unit using at least one of the one or more variable size data chunks based on a size of the new data of the write request; and
   store the new data in the variable size storage unit of a journal at the recovery site computing device.

2. The method of claim 1, comprising:
   transmitting, by the protected site computing device, the write request to the protected site disk, the write request intercepted by the recovery site computing device, the interception of the write request causing the recovery site computing device to:
   compare the size of the new data of the write request to a predesignated size; and
   set the size of the variable size storage unit, responsive to a determination that the size of the new data of the write request exceeds the predesignated size.

3. The method of claim 1, comprising:
   transmitting, by the protected site computing device, the write request to the protected site disk, the write request intercepted by the recovery site computing device, the interception of the write request causing the recovery site computing device to:
   determine that the write request specifies addition of the new data to the variable size storage unit that would cause the plurality of variable size storage units to exceed a maximum journal size; and
   remove, responsive to determining that the addition of the new data exceeds the maximum journal size, data from the plurality of variable size storage units.

4. The method of claim 1, comprising:
   transmitting, by the protected site computing device, the write request to the protected site disk, the write request intercepted by the recovery site computing device, the interception of the write request causing the recovery site computing device to:
   determine that a time between a previous write request and the write request is within a maintenance history time window; and
   store, responsive to determining that the time between the previous write request and the write request is within the maintenance history time window, the new data of the write request in the variable size storage unit of the journal at the recovery site computing device.

5. The method of claim 1, comprising:
transmitting, by the protected site computing device, the write request to the protected site disk, the write request intercepted by the recovery site computing device, the interception of the write request causing the recovery site computing device to:
  move data from the plurality of variable size storage units to a recovery disk, responsive to determining that that write request specifies addition of the new data to the variable size storage unit that would cause the variable size storage unit to exceed a predesignated size;
  remove the data from the plurality of variable size storage units.

6. The method of claim 1, comprising:
transmitting, by the protected site computing device, the write request to the protected site disk, the write request intercepted by the recovery site computing device, the interception of the write request causing the recovery site computing device to:
  determine a time window for the write request;
  identify the variable size storage unit as corresponding to the time window for the write request; and
  select the variable size storage unit from the plurality of variable size storage units to store the new data of the write request, responsive to identification the variable size storage unit as corresponding to the time window for the write request.

7. The method of claim 1, comprising:
transmitting, by the protected site computing device, the write request to the protected site disk, the write request intercepted by the recovery site computing device, the interception of the write request causing the recovery site computing device to:
  determine that none of the plurality of variable size storage units are available for storing the new data of the write request;
  move data from the plurality of variable size storage units to a recovery disk, responsive to the determination that none of the plurality of variable size storage units are available for storing the new data of the write request.

8. The method of claim 1, comprising:
transmitting, by the protected site computing device, the write request to the protected site disk, the write request intercepted by the recovery site computing device, the interception of the write request causing the recovery site computing device to:
  determine that a priority of the write request from the protected site computing device supersedes a priority of a write request from a second protected site computing device; and
  select the variable size storage unit from the plurality of variable size storage units to store the new data of the write request, responsive to the determination that the priority of the write request from the protected site computing device supersedes the priority of the write request from the second protected site computing device.

9. The method of claim 1, comprising:
transmitting, by the protected site computing device, the write request to the protected site disk, the write request intercepted by the recovery site computing device, the interception of the write request causing the recovery site computing device to:
  determine a time window for the write request;
  identify the variable size storage unit as corresponding to the time window for the write request;
  determine that the variable size storage unit includes data; and
  move the data from the variable size storage unit to a recovery disk.

10. The method of claim 1, comprising:
compressing, by the protected site computing device, the new data of the write request based on a specified compression format.

11. A system for data backup and replication, comprising:
a protected site computing device that transmits a write request to a protected site disk, the write request intercepted by a recovery site computing device, interception of the write request causing the recovery site computing device to:
  select a variable size storage unit from a plurality of variable size storage units to store new data of the write request, each of the variable size storage units comprising one or more variable size data chunks and each of the one or more variable size data chunks corresponding to a window of time;
  set a size of the variable size storage unit using at least one of the one or more variable size data chunks based on a size of the new data of the write request; and
  store, the new data in the variable size storage unit of a journal at the recovery site computing device.

12. The system of claim 11, wherein the interception of the write request causes the recovery site computing device to:
  compare the size of the new data of the write request to a predesignated size; and
  set the size of the variable size storage unit, responsive to a determination that the size of the new data of the write request exceeds the predesignated size.

13. The system of claim 11, wherein the interception of the write request causes the recovery site computing device to:
  determine that the write request specifies addition of the new data to the variable size storage unit that would cause the plurality of variable size storage units to exceed a maximum journal size; and
  remove, responsive to the determination that the write request specifies the addition of the new data that would cause the plurality of variable size storage units to exceed the maximum journal size, data from the plurality of variable size storage units.

14. The system of claim 11, wherein the interception of the write request causes the recovery site computing device to:
  determine that a time between a previous write request and the write request is within a maintenance history time window; and
  store, responsive to the determination that the time between the previous write request and the write request is within the maintenance history time window, the new data of the write request in the variable size storage unit of the journal at the recovery site computing device.

15. The system of claim 11, wherein the interception of the write request causes the recovery site computing device to:

move data from the plurality of variable size storage units to a recovery disk, responsive to a determination that that write request specifies addition of the new data to the variable size storage unit that would cause the variable size storage unit to exceed a predesignated size; and remove the data from the plurality of variable size storage units.

16. The system of claim 11, wherein the interception of the write request causes the recovery site computing device to:

determine a time window for the write request;

identify the variable size storage unit as corresponding to the time window for the write request; and select the variable size storage unit from the plurality of variable size storage units to store the new data of the write request, responsive to the identification of the variable size storage unit as corresponding to the time window for the write request.

17. The system of claim 11, wherein the interception of the write request causes the recovery site computing device to:

determine that none of the plurality of variable size storage units are available to store the new data of the write request;

move data from the plurality of variable size storage units to a recovery disk, responsive to the determination that none of the plurality of variable size storage units are available to store the new data of the write request.

18. The system of claim 11, wherein the interception of the write request causes the recovery site computing device to:

determine that a priority of the write request from the protected site computing device supersedes a priority of a write request from a second protected site computing device; and select the variable size storage unit from the plurality of variable size storage units to store the new data of the write request, responsive to the determination that the priority of the write request from the protected site computing device supersedes the priority of the write request from the second protected site computing device.

19. The system of claim 11, wherein the interception of the write request causes the recovery site computing device to:

determine a time window for the write request;

identify the variable size storage unit as corresponding to the time window for the write request;

determine that the variable size storage unit includes data; and move the data from the variable size storage unit to a recovery disk.

20. The system of claim 11, wherein the protected site computing device compresses the new data of the write request based on a specified compression format.

* * * * *